US006281833B1

(12) United States Patent
Pringle et al.

(10) Patent No.: US 6,281,833 B1
(45) Date of Patent: Aug. 28, 2001

(54) RANGE RATE AIDING IN A PULSED RADAR SYSTEM

(75) Inventors: Richard C. Pringle, Van Nuys; Charles T. McMurray, Northridge, both of CA (US)

(73) Assignee: Science and Applied Technology, Inc., San Diego, CA (US)

( * ) Notice: Subject to any disclaimer, the term of this patent is extended or adjusted under 35 U.S.C. 154(b) by 0 days.

(21) Appl. No.: 09/437,828

(22) Filed: Nov. 10, 1999

(51) Int. Cl.$^7$ ........................................... G01S 13/18
(52) U.S. Cl. .................. 342/95; 342/89; 342/94; 342/104; 342/109; 342/110; 342/118; 342/134; 342/135; 342/136; 342/175; 342/195; 342/196
(58) Field of Search .............................. 342/82, 89–105, 342/109, 110, 118, 131, 132, 134–145, 175, 189, 194, 195, 196

(56) References Cited

U.S. PATENT DOCUMENTS

| | | | |
|---|---|---|---|
| 3,716,858 | * | 2/1973 | Worthington ........................... 342/95 |
| 3,769,589 | * | 10/1973 | Buntschuh et al. .............. 342/100 X |
| 3,813,670 | * | 5/1974 | Alpers .................................... 342/95 |
| 4,063,238 | | 12/1977 | Conner, Jr. . |
| 4,148,026 | | 4/1979 | Gendreu . |
| 4,156,875 | | 5/1979 | Keane . |
| 4,217,581 | | 8/1980 | Prickett . |
| 4,499,466 | | 2/1985 | Torino, Jr. . |
| 4,529,930 | | 7/1985 | Evel et al. . |
| 4,590,476 | | 5/1986 | Burkett . |
| 4,768,017 | | 8/1988 | Gordon . |

\* cited by examiner

*Primary Examiner*—Bernarr E. Gregory
(74) *Attorney, Agent, or Firm*—Brooks & Fillbach; Michael Blaine Brooks; Andrew Steven Naglestad

(57) ABSTRACT

A timing and control method and apparatus (111) for performing precise range rate aiding includes a range gate delay means (114) for generating an estimate of the range gate delay (135) each pulse repetition interval as a function of the initial range (134) and velocity (133) provided by a processor (104). The range gate delay (135) is converted into a coarse delay (138) defining the integral number of clock cycles preceding the range gate, and a fine delay (139) for positioning a range gate to within a fraction of a clock cycle. Fine temporal control is achieved using programmable delay lines (117) and (118), which retard various control signals, including the system clock signal (131), in accordance with the fine delay (139). A modified signal (126) then drives a counter means (119) which outputs a signal (128) that defines an analog-to-digital sampling window beginning at the elapse of the range gate delay (135). The apparatus (111) may further include a rate reducing means (115) for reducing the frequency at which the range gate delay (135) is generated, thereby permitting the delay (135)to be precisely regulated to within a fraction of a nanosecond over a period of multiple pulse repetition intervals.

25 Claims, 4 Drawing Sheets

RANGE RATE AIDING IN A PULSED RADAR SYSTEM

The U.S. Government has a paid-up license in this invention and the right in limited circumstances to require the patent owner to license others on reasonable terms as provided for by the terms of contract No. N00019-94-C-0078 awarded by U.S. Department of Defense (Navy).

BACKGROUND OF THE INVENTION

This invention relates to a method and apparatus for the generation of radar range gates. More specifically, the present invention relates to a range rate aiding device having the ability to autonomously control the range gate sampling of a non-stationary target over the course of multiple pulse intervals.

The function of most radars is to first determine the location of a target, often in spherical coordinate representations including its range (distance) and angles (direction). A target is defined broadly to include any object of interest that reflects energy back to the radar where it is capable of being detected. A pulsed radar system acquires information about objects of interest by transmitting bursts of electromagnetic energy and then processing the reflected signals. Successive pulses are transmitted at a pulse repetition frequency (PRF) giving rise to a train of pulses separated by a pulse repetition interval (PRI).

Once identified, the radar must keep the reflected object, or target, within a tracking range interval, or gate. The range of the target is determined by measuring the elapse time, or echo time, between the transmission of the radiation from the transmitter and its reception after being reflected from the target. The echo time is a function of the propagation distance from the transmitter to the target and back to the receiver. It is common, though not necessary, that a single antenna be used for both transmission and reception, in which case the echo time is given by $2R_{TR}/c$, where $R_{TR}$ is the distance between the target and the radar, and c is the speed of light. The echo time will vary with the relative location and motion of the radar and target.

In modern radar applications, the return signal is commonly processed by being amplified, filtered and demodulated to produce a video signal which refers to the echo signal after removal of the carrier frequency. In a digital system, the video signal is sampled repeatedly with an analog-to-digital (A/D) converter. A single sample of the digital video signal, acquired at a given delay interval after the transmitted pulse, is called a range gate. A searching radar may employ a series of range gates covering the entire pulse repetition interval in order to investigate the entire spatial region up to the maximal range, each range gate corresponds to a select point in space.

The signal data are conveyed to a processor for target identification and tracking purposes. The function of target identification is to distinguish between that portion of the transmitted pulse reflected back by the target from the extraneous portion of the echo; the extraneous portion being termed clutter. After identification and selection of a target, the relative distance of the target is tracked through successive pulse repetitions. Target tracking may involve updating the range gate delay interval as well as the number of range gates. It is common to allow a sampling window to cover one or multiple range gates. A tracker mechanism may either manually or automatically adjust the range gate delay to fix, or otherwise set firmly, the relative position of the echo with that of the digital sampling window. The position of the sampling window is continually updated to keep it centered on the target as the echo shifts temporally.

One circuit for range tracking is the split-gate range tracker which uses two gates straddled about the echo; an "early gate" to cover the initial portion and a "late gate" to cover the final portion. The range gate delay is properly chosen where the signal energy enclosed by each of the gates is the same. Any difference in energy provides a measure of the error, and can be used to modify the range gate delay.

Range rate aiding, also termed velocity aiding, refers to a technique used to adjust the range gate delay between pulse repetitions to compensate for the relative motion of the target. The objective is to minimize the variation between the echo time and range gate delay. The target tracking functions are frequently performed by electronic circuitry as opposed to software executed by a computer because the computer may not be capable of updating the range information at rates sufficiently high to maintain the sampling window centered on the moving target. Dedicated tracking circuitry has the advantage that it may independently track the target of interest after being provided with the range and velocity. With dedicated tracking circuitry, the computer need only periodically update the range information and account for acceleration.

Present methods of range rate aiding are excessively large or complex for missile applications and applications where the radar platform is small and rapidly mobile. One prior art implementation uses a tapped delay line wherein discrete delay intervals, each separated by a desired velocity aiding increment, are produced at the taps on such a line. Control of the velocity aiding is then determined by the particular tap selected.

A second velocity aiding technique is described in U.S. Pat. No. 4,156,875 to Keane in which the range gate delay is controlled by two clocks. The first clock provides coarse control and the second, running at a higher frequency, provides fine control. After receiving the initial range and velocity, the sampling electronics converts the estimated range to a number of cycles of the coarse clock. The delay represented by the coarse clock corresponds to a coarse delay, and is substantially equal to the estimated range. When a counter running off the coarse clock has finished counting off the coarse delay, a second counter running off the fine clock begins counting. The number of cycles of the fine clock is calculated such that the fine delay, when added to that of the coarse delay, causes the range gate to be positioned as close as possible to the estimated echo time. The coarse and fine delays are then modified at the beginning of each successive PRI.

The ability of the Keane apparatus to adjust finely the range gate is limited by the frequency of the fine clock. More specifically, the degree of control is proportional to the frequency of the clock. The attaining of the precision required by modern radars necessitates the use of clocks operating in the gigahertz range. Such clocks and the associated tracking circuitry pose formidable engineering challenges and may be prohibitively expensive for practical applications.

SUMMARY OF INVENTION

It is an object of this invention to provide a timing and control mechanism of a target tracking system that performs range rate aiding with the ability to finely position the range gate relative to a non-stationary echo signal.

It is another object of this invention to provide a digital sampling apparatus capable of digitizing echo signals at intervals finer than that of an A/D converter sampling interval, whereby an order of magnitude increase in temporal resolution may be attained.

These and other objects of the present invention are attained by a timing and control method and apparatus for performing range rate aiding. The apparatus autonomously modifies the range gate delay between pulse repetitions, then converts the range delay into (1) a coarse delay defining the number of clock cycles preceding the range gate; and (2) a fine delay defining the gate to within a fraction of a clock cycle. Programmable delay lines (PDLs) then retard the various control signals according the fine delay, allowing the range gate to be located precisely.

The timing and control apparatus is responsive to a target tracking system that identifies a target, estimates the position and velocity of the target, and determines the appropriate range gate delay. The target tracking system represents the range gate delay in terms of two delays; an initial delay associated with the initial position of the target and an incremental delay, which accounts for the range rate of the target between the successive PRIs. The current range gate delay is then the sum of the preceding range gate delay and the incremental delay. The degree of precision to which these numbers may be defined is determined by the resolution of the programmable delay line, which in the present invention is a small fraction of an A/D sampling interval.

The timing and control electronics converts the range gate delay of the current PRI into a second pair of delays. The first is a "coarse delay" approximately equal to the time between the transmitted pulse and the anticipated echo, and is an integer multiple of the period of a clock cycle. The second number is "fine delay" which represents the difference in time between the coarse delay and the current range gate delay. The fine delay may be either positive or negative, but the magnitude ranges between zero and one clock period. The fine delay is defined to be an integer number of programmable delay increments, where an increment is equal to the resolution of the PDL. The sum of the coarse and fine delays represents the range gate delay and is substantially equal to the estimated echo time.

The fine delay is used to modify various control signals, including the transmitter trigger signal and system clock. The modified signals then drive the timing and control circuitry, including the counter that counts out the coarse delay, as well as most other preprocessor functions, i.e., sample signal storage and digital signal processing. The result is a cohesive digital data acquisition system that operates at the rate of the system clock but with a delay control permitting the range gate delay to be placed within a nanosecond of the estimated echo time.

To account for variations in the target position, the current range gate delay is generated at the beginning of each PRI by adding the incremental delay to the range gate delay of the previous PRI. The target tracking system, principally the algorithms running in the software of the processor, refreshes the range and velocity data after a predetermined period of time. The timing and control apparatus therefore permits a target to be tracked with improved temporal control, resulting in more accurate range and velocity estimates, improved signal to noise ratios, and reduced motion blur.

DETAILED DESCRIPTION OF THE INVENTION

Figure 1:
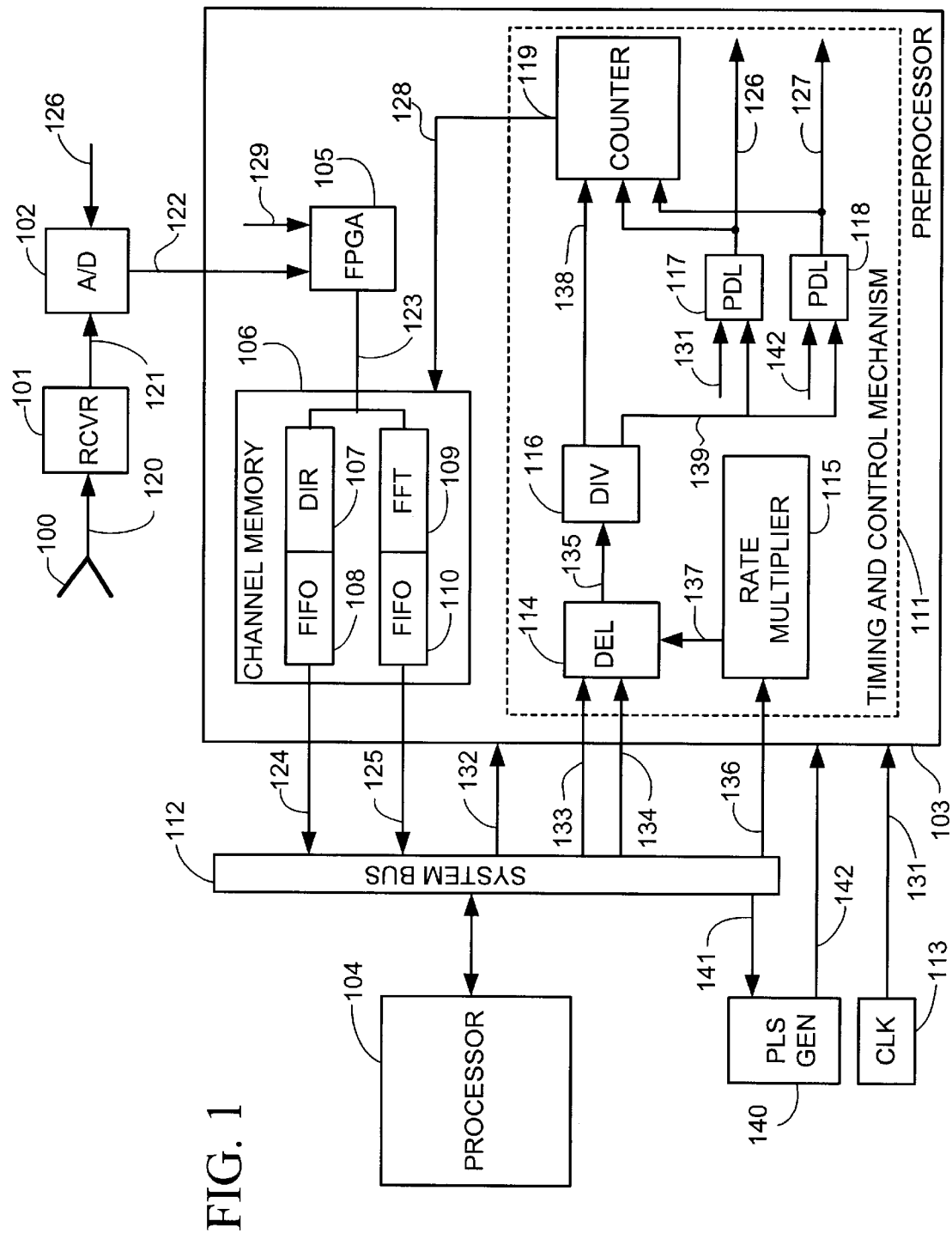
FIG. 1 is a block diagram of a generalized digital pulsed radiation detection system including the timing and control apparatus for positioning the range gate.

Referring to FIG. 1, a typical digital pulsed radiation detection system is shown. The radar includes a millimeter wave antenna 100 capable of detecting the electromagnetic radiation reflected from a target (not shown). The received signal 120 is conveyed to the receiver 101 where it is amplified and demodulated. In the preferred embodiment, the receiver 101 is designed to perform envelope detection but a quadrature detection system would be equally suitable depending on the particular application and whether Doppler information is required. The signal 121 from the receiver 101, referred to as the video signal, must be of a power level and frequency appropriate for the analog to digital (A/D) converter 102.

The digital signal 122 from the A/D converter 102 is then conveyed to the preprocessor 103 where it is received by the field programmable gate array (FPGA) 105 for DC offset correction and threshold detection set by means of programmed signals 129. The channel memory 106 of preprocessor 103 receives the digital echo signal 123 from the FPGA 105 as well as control signals (not shown) from the timing and control mechanism 111. The channel memory 106 includes channels 107 and 109 for performing direct and FFT manipulation, respectively. The data of channels 107 and 109 are stored in First-In-First-Out (FIFO) memories 108 and 110, respectively, where they are made available to the processor 104 via the system bus 112. The processor 104 also communicates signals to the preprocessor 103 and the timing and control mechanism 111 to write the various time and duration variables necessary to acquire the echo signal. Signal 132, although taken from the system bus 112, originates from the processor 104 and conveys, among other things, write enable signals.

The processor 104 is a digital computer and may be responsible for the operational control of various systems, which may include such functions as vehicle guidance and control, target detection, and maintenance of target information files. Processor 104 is preferably dedicated to target identification as well as the initial position and velocity estimation used by the timing and control mechanism 111. Target identification is based upon the direct time-domain echo signals processed by the direct channel 107 and/or Fast Fourier transform (FFT) representations of the echo generated in FFT channel 109, which are in turn made available to the processor 104 via output 124 and 125.

After a target is identified, the processor 104 estimates the transmitter-to-target range as well as the radial (relative) velocity of the target. Both the initial range 134 and velocity 133 estimates are conveyed to the timing and control mechanism 111 where they are applied in range gate delay means 114 to determine the range gate delay 135 for the current PRI. The initial range 134 and velocity estimates 133 are downloaded to the timing and control mechanism 111 at a first PRI and remain unchanged for two or more successive PRIs comprising a pulse train. The series of pulses are internally programmed at the pulse generator 140 and asserted at a pulse repetition frequency 141 given by the processor 104. Individual transmitted pulses are initiated in the form of a PRI trigger signal 142 applied in the timing and control mechanism 111 and preprocessor 103 generally. The timing and control mechanism 111 may also include a rate multiplier means 115 that responds to the input 136 from processor 104 to lower the average rate at which the range gate delay 135 is updated. In divider 116 the current range gate delay 135 is divided into an integer number of A/D sampling points 138 and an integer number of programmable delay increments 139. Programmable delay lines 117 and 118 modify, respectively, the system clock 131 of system clock device 113 and the PRI trigger signal 142 to produce the altered control signals resulting in the very fine adjustment of the range gate delay. A delayed clock signal 126 and a delayed PRI trigger signal 127 are conveyed to the counter means 119 as well as the appropriate preprocessor functions. After counting out the integer number of sampling points 138, counter means 119 asserts the sample window signal 128 that enables the storage and processing of the output of the A/D converter 102. Since the counter means 119 is driven by the modified system clock signal 126, the total delay preceding the assertion of the sampling window signal 128 is the sum of the delays represented by signals 138 and 139. In order for the digital preprocessor 103 to remain synchronized, the channel memory 106 and A/D converter 102 are driven by the delayed system clock 126 at the same rate and with the same temporal delay, or phase shift.

The A/D converter 102 receives the delayed system clock signal 126 and digitizes the video signal 121 with the fine delay prescribed by the fine delay increment 139 of the timing and control mechanism 111. In the preferred embodiment, the A/D sampling rate is given by a fixed frequency, $F_S$, resulting a sampling interval, $T_C$. Any adjustment of the digital sampling takes the form of a temporal shift that is made in accordance with the relative velocity of the target. Shifts finer than one nanosecond can be programmed by the timing and control mechanism 111.

Figure 2:
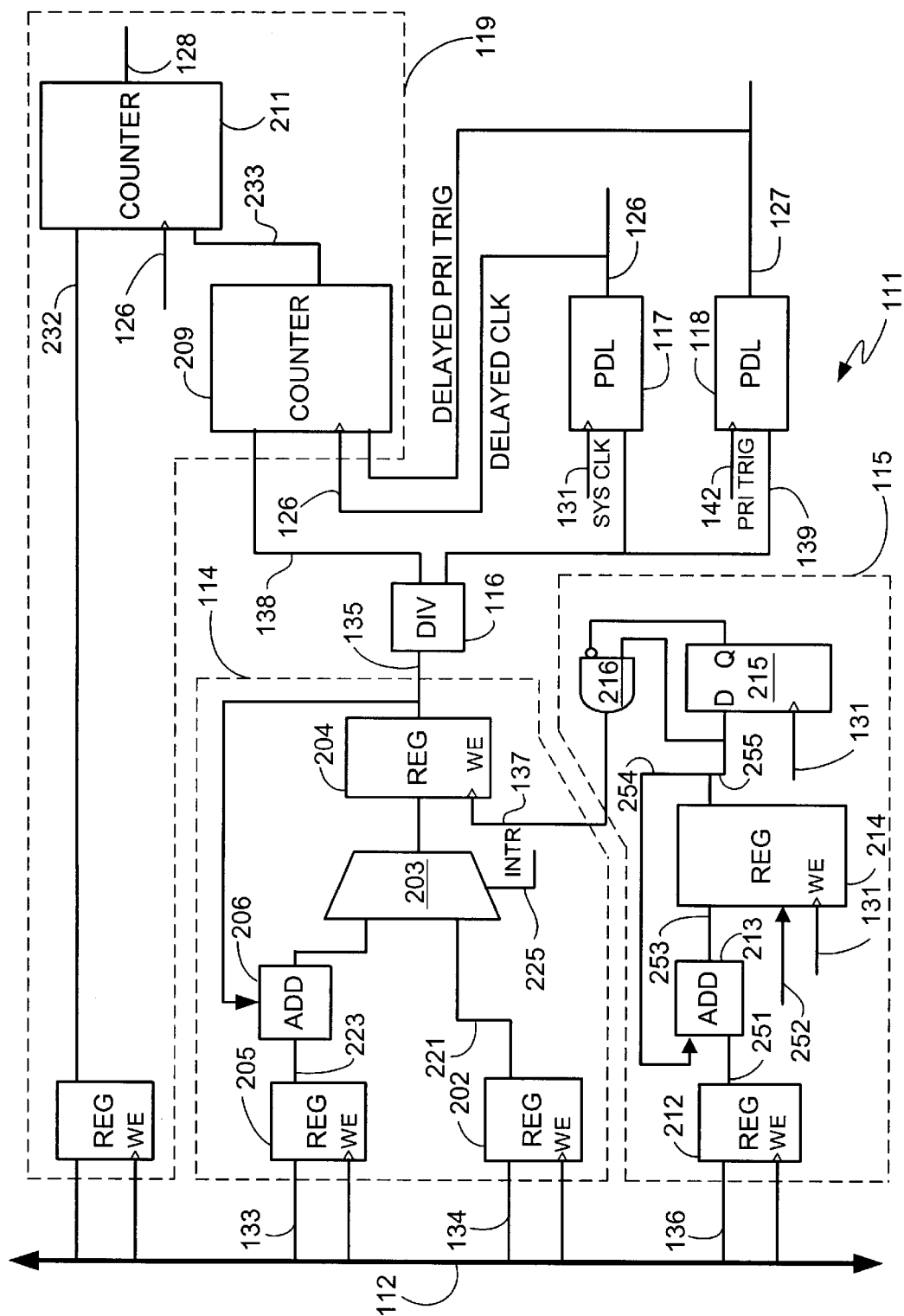
FIG. 2 is a block diagram of the timing and control apparatus of the present invention for fine adjustment of the target range gate delay using velocity aiding.

Referring now to FIG. 2, the block diagram of the circuit for generating the range gate delay with velocity aiding is illustrated. The processor 104 (FIG. 1) communicates with the timing and control mechanism 111 via the system bus 112. The initial range and velocity estimates are determined by the processor 104 and conveyed to the appropriate registers of the timing and control mechanism 111 where they are latched. The initial range and velocity estimates are recalculated each time a target is identified or updated estimates of the range and velocity of an existing target made.

The initial range is represented in the form of a delay latched by register 202, and referred to as the initial range gate delay 221. The initial range gate delay 221 represents the period of time, in fine delay increments, after the transmitted radar pulse that the return echo signal is expected. The fine delay increment is the smallest increment by which the timing and control may reliably position an individual range gate delay. The fine delay increment, $T_F$, is preferably equal to a single programmable delay increment of the PDL. The better the PDL resolution, the smaller the fine delay increment, $T_F$. The interrupt signal 225 is asserted at the beginning of a pulse sequence and the range gate delay 221 passed by the data selector 203.

Register 205 latches the velocity increment 223 originating with the target tracking function of the processor 104. The velocity increment 223 represents the expected time by which the range gate delay must be shifted between successive pulses in order to account for the change in the echo time resulting from the relative velocity of the target and missile. The velocity increment 223, also an integer number of fine delay increments, covers a range of negative and positive values corresponding to the change in echo time as the radar on the missile or other vehicle closes in on the target or the target moves away from the radar. In the preferred embodiment, the velocity increment is a four bit number ranging between minus four and positive three nanoseconds. Where the estimated difference between successive returns is less than a single fine delay increment, the magnitude of the velocity (delay time shift) increment 223 should be rounded upwards and the average pulse repetition rate reduced by means of a rate reducing mechanism 115 (shown in block form in FIG. 1 and in detail below). A practitioner in the art will note that the initial range gate delay and velocity increment may also be embodied in electronics using dedicated circuitry or the equivalent.

The velocity increment 223 is conveyed to the adder 206 where it is added to the range gate delay 135 of the previous PRI. The adder 206 thus provides a means for generating a range gate delay 135 that is a linear combination of an initial range gate delay and one or more incremental delays associated with the velocity. At the interrupt pulse 225, the range gate delay 135 takes on the value of the initial delay 221 as selected by the data selector 203 (interrupt high) and simultaneously loaded into register 204. Thereafter, at each pulse of trigger 137, the range gate delay 135 is decremented (or incremented) at the adder 206 by the velocity increment 223 and loaded into register 204. The velocity increment 223 may also be updated contemporaneously with the interrupt signal 225 which is periodically asserted to account for error in the range gate delay or changes in the velocity.

The range gate delay 135 is then conveyed to divider 116, the purpose being to separate the range gate delay 135 into an alternate representation of "fine" and "coarse" delays. In the preferred embodiment, the divider 116 is a programmable read only memory (PROM) device in which a look-up table relating a range gate delay to its corresponding fine and coarse delays is preprogrammed. The coarse delay 138 is equivalent to the integer number of A/D clock cycles of the range gate delay 135. The fine delay 139 is an integer number of fine delay increments, where an increment is equivalent to the temporal resolution of a programmable delay line (e.g., one nanosecond). Just as the range gate delay 135 is a weighted linear combination of range and velocity delays, the output of divider 116 is a combination of fine and coarse delays, the sum being equivalent to the range gate delay 135. The divider 116 then provides a means for performing a division in which the numerator is the delay 135 and the denominator is the number of fine delay increments per coarse delay increment, i.e., $T_C/T_F$. The A/D sampling interval in the preferred embodiment is comprised of a number of fine delay increments, each being one nanosecond.

One skilled in the art will notice that the output 138 of divider 116 is the modulus of the quotient (M), and therefore represents the integer number of A/D sampling points of the range gate delay 135. The output 139, on the other hand, represents the residue (R) or the integer number of fine delay increments of the remainder. The output 139 is then the number of nanoseconds by which the phase of the A/D sampling clock must be shifted to cause the range gate delay 135 to coincide with the estimated echo time by less than a nanosecond. The R output 139 by definition must be a positive integer value between zero and $T_C/T_F$ ($0 \leq R < T_C/T_F$).

The point of novelty is the application of the programmable delay lines to obtain the long sought after nanosecond level of range gate precision while avoiding prohibitively expensive realizations. A programmable delay line (PDL) is a digital device that causes a digital signal input to be reproduced at its output with a temporal delay. The delay is programmable, and is governed by the number of delay increments held on the control data input. The minimal non-zero programmable delay is fundamentally limited by the accuracy of the PDL, which is preferably as small as possible. The maximum delay on the other hand must be equal to or greater than the period of the A/D sampling clock. One skilled in the art will recognize the suitability of various alternatives for performing the delay functions of the PDLs, including phase locked loops.

The PRI trigger 142 and system clock signal 131 are converted to the delayed PRI trigger 127 and delayed clock signal 126, respectively, each retarded by a delay of R nanoseconds. The R output 139 is provided as a data input to both first PDL 117 and second PDL 118. The signal input to the first PDL 117 is the system clock signal 131, which determines the frequency of the data acquisition system including the A/D converter 102 and signal processing hardware of preprocessor 103 described in FIG. 1. Referring briefly to FIG. 1, the output of first PDL 117, the delayed clock signal 126, is used by the A/D converter 102 to sample the video input 121 as well as preprocessor 103 to synchronously transfer sampled and processed video throughout the rest of the system.

The signal input to second PDL 118 is the transmitter trigger, PRI trigger 142. The PRI trigger 142 is indirectly controlled by the processor 104 and signifies the beginning of a PRI. The output of second PDL 118, delayed PRI trigger 127, provides a reference signal in a coordinate system (shifted by R fine delay increments) from which the counter means 119 counts out the integer number of A/D sampling intervals preceding the range gate delay 135. One skilled in the art will recognize that the range gate delay may be generated relative to any one of a number of other reference signals provided the signal varies in a known and predictable manner with respect to the beginning of the PRI.

The delayed PRI trigger 127 causes the down counter 209 to be loaded with the number of A/D sampling intervals (coarse increments) of the current range gate delay 135. The first counter 209 then begins decrementing at each cycle of the delayed clock signal 126 until the counter reaches zero, signifying the end of the range gate delay. At this point in time a second counter 211 is loaded with the sample number 232 at the terminal count event 233 of first counter 209. The sample number 232 represents the number of individual range gates comprising a sampling window. The second counter 211 begins decrementing at each cycle of the delayed clock signal 126 until this counter reaches zero. While the counter 211 is decrementing, the video signal 121 is sampled and digitized according to the delayed clock signal 126, then stored and processed. Since the counters 209 and 211 are operating under the control of the delayed clock signal 126, it is possible to locate the one or more range gates comprising the A/D sampling window signal 128 with one nanosecond accuracy over the course of multiple PRIs.

In addition to the counters 209 and 211, the delayed clock signal 126 drives the A/D converter 102 as well as most of the other circuits of the preprocessor 103. The delayed PRI trigger 127 and delayed clock signal 126, as well as the sampling window signal 128, are conveyed to the channel memory 106, described in FIG. 1, where they synchronize the preprocessing with the A/D converter 102. The result is an integral data acquisition subsystem that operates at the rate of the system clock 131 but with independently controlled phase for the duration of a PRI and thereby compensates for any velocity changes in the target. The echo data, after processing by the channel memory 106, is stored to the FIFO memory 108 or 110. Due to the asynchronous capability of the FIFO memory, the echo datum is made available to the processor 104 at the independent processor clock rate.

The preceding discussion has addressed velocity aiding means for positioning the range gate delay 135 with the nanosecond precision of the programmable delay lines 117 and 118. Below is described one of multiple possible means for reducing the average rate of the PRF by a predetermined fractional amount, thereby positioning the range gate delay with arbitrary precision over the course of multiple pulse repetition intervals.

Referring still to FIG. 2, register 212 latches a number 251 originating from the processor 104. The number 251 is a multiplier, and determines the fractional reduction in the rate at which the range gate delay must be updated in order to properly track the return signal over an extended period of time. The rate at which the radar is pulsed remains invariant, but the frequency, at which range gate delay 135 is decremented (or incremented), is reduced. The range gate delay 135 is therefore decremented at a rate equal to or less than the PRF. The system that modifies the range gate delay 135 in essence "skips a beat" periodically to compensate for accumulation of round-off error in the original determination of the range gate delay 135. The average delay by which the range gate delay is modified over the course of many PRIs is different than the velocity increment 223, and more closely matches the actual velocity of the mobile emitter.

The multiplier 251, representing the numerator, is an n-bit number latched by register 212. The n-bit adder 213 combines the multiplier 251 with the signal 254 to produce signal 253. The register 214 is n-bits wide, and is loaded according to a pulse trigger 252 operating at twice the rate of the PRI trigger 142 (2×PRI trigger). The n-bit output signal 254 of register 214 is conveyed back to the adder 213, and the most significant bit (msb) 255 is used to "write enable" register 204 by means of flip-flop 215 and AND gate 216.

On the condition that $0 \leq m \leq 2^{n-1}$, the write enable 137 will be asserted at the rate given by the product of the rate of trigger 252 and the fractional time $(m/2^n)$. Since the frequency of the trigger 252 is twice that of the PRF, the register 204 is updated at a rate given by $(m/2^{n-1}) \times (PRF)$, where the PRF is the frequency of the PRI trigger 142. In the preferred embodiment, m =64, which permits the sampling window signal 128 to track variations in the return echo time as small as $2^{-63}$ nanosecond.

Those skilled in the art will recognize this is but a single example of means to reduce the pulse rate, and that there are various other equivalent means.

Figure 3:
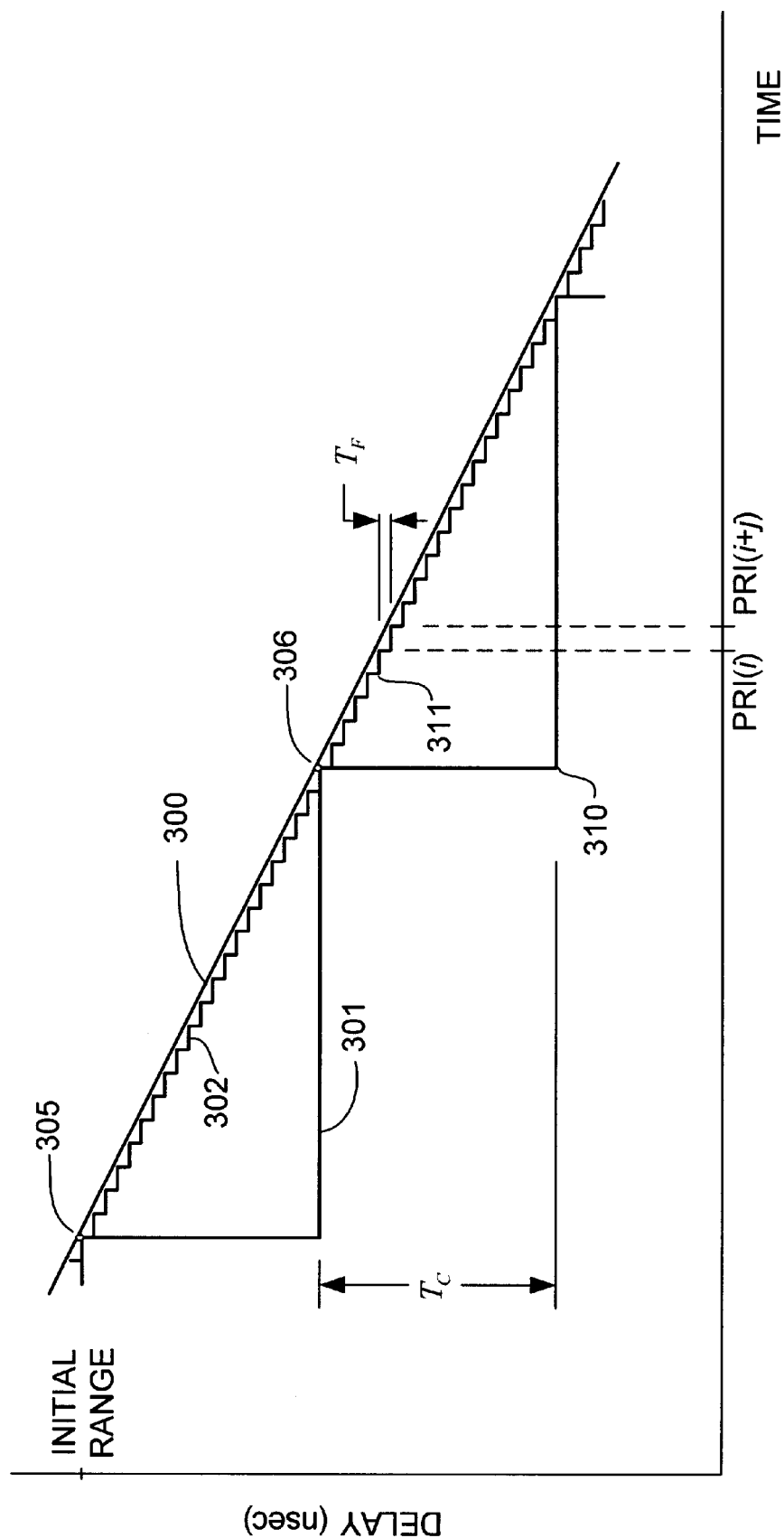
FIG. 3 illustrates the range gate delay as it is modified over the course of multiple pulse repetition intervals practicing the present invention.

Referring to FIG. 3, the echo time is charted as a function of the PRI number. The continuous line 300 represents a plot of the actual delay after the radar pulse is transmitted that the return echo is received. On the horizontal axis the time between the ith and i+jth pulses are shown, where the index j may be any integer greater than zero. The actual return time is determined from the vertical axis. Assuming j=1 and $T_F$=1 nanosecond, line 300 depicts the echo of a mobile emitter converging on a target at a constant range rate of one nanosecond per PRI.

Also represented in FIG. 3 are the range gate delays of two velocity aiding apparatuses represented by the stairstep-like traces 310 and 311. In each case, the range gate delay is consistently chosen to be less than the actual echo time in order to ensure that the echo is received during the period of data acquisition. Trace 310 represents the range gate delay of a first digital target tracking apparatus operating with a fixed A/D converter sampling rate of $F_S$. As illustrated by line segment 301, the range gate delay remains constant for many successive PRIs. When the range gate delay nearly coincides with the echo time as illustrated by point 306, the range gate delay is reduced by $T_C$, the duration of an A/D interval expressed in nanoseconds. The vertical distance between the line segment 301 and the line 300 therefore represents a measure of the error in the echo time measurement.

A superior result is attained with the use of the velocity aiding apparatus of the present invention, as illustrated by trace 311. Even when operating at the same frequency, $F_S$, the present invention permits the phase of the system clock 131 to be shifted. The phase shifts in turn permit the range gate delay 135 to be modified between PRIs to account for temporal variations smaller than a single A/D clock period. The delay 135 is capable of being shifted in one nanosecond intervals. This shifting capability permits deviations between the actual echo time and the range gate delay to be reduced to less than a nanosecond. For $T_F=1$ nanosecond, the error represented by the vertical distance between the line segment 302 and line 300 is significantly reduced when compared to the prior art.

It is advantageous for signal processing purposes to vary the range gate delay of successive PRIs such that the sampling window is placed uniformly and consistently relative to the echo signal. Variation between the delay 135 and echo time 300 contribute to the motion blur and reduced signal-to-noise ratios. The velocity aiding apparatus of the present invention minimizes this variation by autonomously tracking the target echo based upon initial estimates alone. More specifically, the trace 311 is made to track the echo 300 without the intervention of processor 104. In the preferred embodiment, the initial range 221 and velocity 223 are determined at the beginning of a target tracking loop. The range 221 is generated from the echo time 305 and the velocity determined by comparisons of multiple prior echo times. As the mobile emitter converges on the target, the echo time is reduced and traces the line 300. With each transmitted pulse of the radar, an updated range gate delay 135 is generated in the hardware of the timing and control mechanism 111 based upon the range gate delay of the prior PRI and the velocity increment 223. Using the present invention, the range gate delay 135 is determined within a nanosecond, yielding trace 311. Variations as small as one nanosecond are tracked from one PRI to the next, resulting in a $T_C/T_F$-fold improvement in the temporal resolution without the addition of high speed clocks.

Echo Data Interleaving

To this point in the description of the present invention, its application has focused on achieving a practical and cost effective minimization of variations between the range gate delay and the echo time. As a second application of the present invention, the difference in time between the echo time and the range gate delay may be deliberately varied to a known degree so as to generate a finely sampled echo signal of moving or stationary targets in addition to the target tracking function described above. For purposes of this application, timing and control mechanism 111 remains unchanged but the processor 104 generates a modified increment 223. This new delay increment 223 has the same form as the velocity increment 223 but is substantively different in that it is a combination of the appropriate velocity delay increment and an offset delay. The purpose of the offset delay is to shift the sampling window relative to the echo between successive PRIs. The various sampled echo data may then be interleaved to artificially create echo data with hyper-fine temporal resolution.

Referring to FIG. 4, hyper-fine sampled echo data is shown graphed as amplitude (ordinate) versus time (abiscissa). FIG. 4A depicts the envelope of a return echo prior to digitization. The signals 402 and 403 represent digital sampling data of the echo 401 taken at two successive PRIs. FIGS. 4B and 4C taken together illustrate that the echo of FIG. 4C was sampled with an offset delay, D, equal to half the period of an A/D sampling period. The offset delay, D, represents the variation in the sampling data with respect to the echo 401 after the variation in echo times has been recognized and compensated.

Figure 4A:
FIGS. 4A through 4D demonstrate how multiple pulse repetition echo data may be combined to exceed the inherent sampling rate of the A/D converter.
Figure 4B:
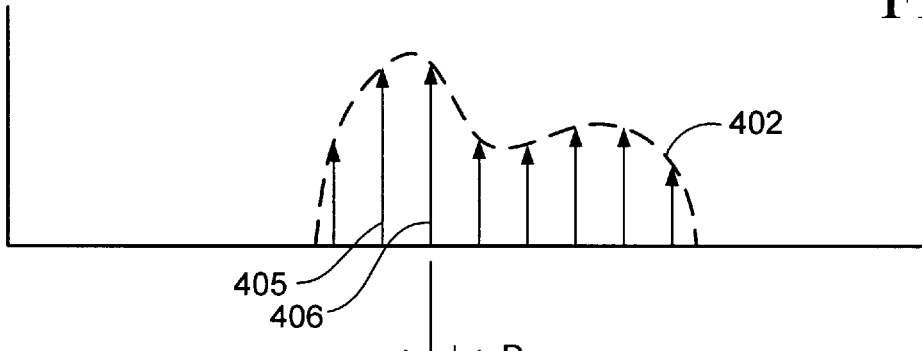
Figure 4C:
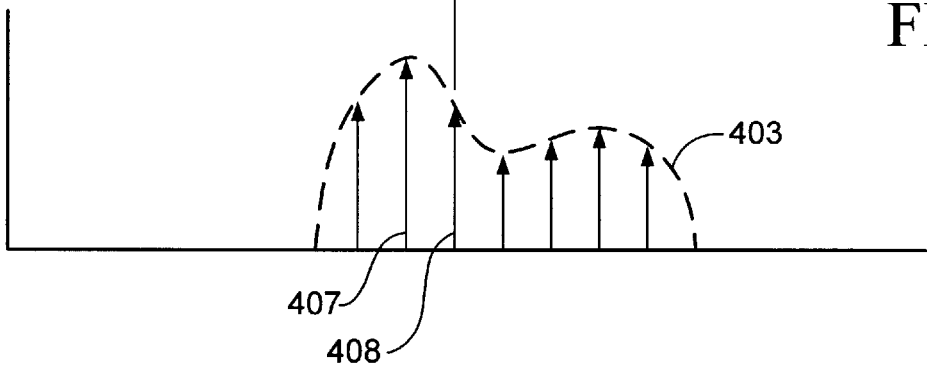
Figure 4D:
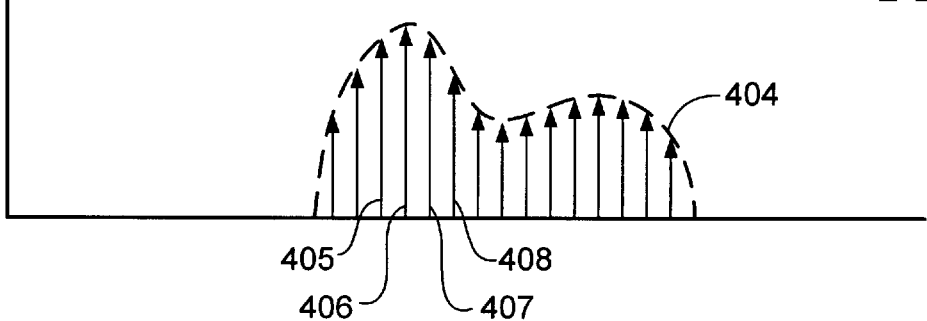

While sample points 405 and 406 are acquired at $T_c$ nanosecond intervals, as are 407 and 408, the data of FIGS. 4B and 4C differ by a phase shift of 180 degrees. The alternating data points of signals 402 and 403 may then be combined to create a new signal 404 equivalent to an echo signal digitized at double the A/D sampling rate, or $2 \times F_S$ MHz. On the condition that the envelope of echo 401 is substantially invariant in time over the duration of the acquisition period, a maximum of $T_C/T_F$ unique samplings of the echo may be collected with a single delay increment 223. With an offset delay corresponding to one nanosecond, one may generate a final echo signal equivalent to that acquired with an A/D converter operating at a rate of $(T_C/T_F) \times F_S$, which may realistically be more than one gigahertz.

Although the above description contains many specifics, these should not be construed as limiting the scope of the invention, but rather as merely providing illustrations of some of the presently preferred embodiments of this invention.

Therefore, the invention has been disclosed by way of example and not limitation, and reference should be made to the following claims to determine the scope of the present invention.

We claim:

1. A timing and control apparatus of a preprocessor in a pulsed radiation system for detecting echo signals; said pulsed radiation system including a radiation detector, receiver, analog-to-digital converter, system clock signal, pulse repetition interval trigger input, and target range and velocity estimates; said timing and control apparatus comprising:

(a) range gate delay means for generating a range gate delay being comprised of an initial delay and one or more incremental delays; the initial delay corresponding to range at a first pulse repetition interval, and the incremental delay corresponding to velocity;

(b) dividing means for generating from said range gate delay a coarse delay and a fine delay; said coarse delay representing an integer number of analog-to-digital sampling intervals of the range gate delay; said fine delay representing a difference between the range gate delay and the coarse delay, and expressed as an integer number of programmable delay increments;

(c) first programmable delay means for retarding the phase of the system clock signal by said fine delay;

(d) second programmable delay means for generating a delayed trigger by retarding a pulse repetition interval trigger by said fine delay; and (e) counting means, responsive to said first and second programmable delay means, for initiating analog-todigital conversion of an echo signal a period of time after the delayed trigger of 1(d); said period of time given by said coarse delay;

whereby a range gate is made to coincide with the beginning of the echo signal.

2. The timing and control apparatus of claim 1, wherein the first and second programmable delay means are solid state programmable delay lines.

3. The timing and control apparatus of claim 2, wherein the counting means is comprised of a first counter for asserting an output signal coinciding with the end of the range gate delay.

4. The timing and control apparatus of claim 3, wherein the counting means further includes a second counter responsive to the first counter for causing the analog-to-digital converter to digitize the echo signal over one or more range gates.

5. The timing and control apparatus of claim 2, wherein the apparatus further includes rate reducing means for modifying the rate at which the range gate delay means generates estimates of the range gate delay.

6. The timing and control apparatus of claim 1, wherein the first and second programmable delay means are phase locked loops.

7. The timing and control apparatus of claim 1, wherein the dividing means is a programmable read-only memory device.

8. A timing and control apparatus of a pulsed radar including a radiation detector, receiver, analog-to-digital converter, and system clock signal; said pulsed radar further including a pulse repetition interval trigger signal input to the timing and control apparatus; said timing and control apparatus comprising:

(a) range gate delay means for generating a range gate delay being a weighted linear combination of delays corresponding to target range and velocity estimates;

(b) dividing means for converting the range gate delay into an integer M and an integer R; said integer M representing a number of analog-to-digital sampling clock periods of the range gate delay; said integer R representing a number of programmable delay increments; a total delay represented by a weighted sum of M and R being substantially equal to the range gate delay;

(c) first programmable delay means for delaying the phase of the system clock signal by R programmable delay increments;

(d) second programmable delay means for delaying a pulse repetition interval trigger by R programmable delay increments; and (e) counting means, responsive to said first and second programmable delay means, for triggering acquisition of a range gate upon counting M analog-to-digital sampling clock periods after assertion of the trigger of 8(d);

whereby the acquisition of echo data may be controlled to within a fraction of an analog-to-digital sampling interval.

9. The timing and control apparatus of claim 8, wherein the first and second programmable delay means are solid state programmable delay lines.

10. The timing and control apparatus of claim 9, wherein the apparatus further includes rate reducing means for modifying the rate at which the range gate delay means generates estimates of the range gate delay.

11. The timing and control apparatus of claim 9, wherein the counting means includes a first counter for asserting an output signal coinciding with the end of the range gate delay.

12. The timing and control apparatus of claim 11, wherein the counting means further includes a second counter responsive to the first counter for acquiring a plurality of range gates.

13. The timing and control apparatus of claim 8, wherein the first and second programmable delay means are phase locked loops.

14. The timing and control apparatus of claim 8, wherein the dividing means is a programmable read-only memory device.

15. A timing and control apparatus of a pulsed radar system; including a radiation detector, receiver, analog to digital converter, system clock signal, and pulse repetition interval trigger signal; said timing and control apparatus comprising:

(a) range delay means for determining a range delay corresponding to an initial range-to-target;

(b) velocity delay means for estimating an incremental delay by which echo times vary between successive pulse repetition intervals; said incremental delay corresponding to the relative velocity of radar and target;

(c) range gate delay means, responsive to the range delay means and velocity means, for generating a current range gate delay by combining the range delay and one or more incremental delays; said current range gate delay representing an estimated echo time;

(d) dividing means for decomposing the current range gate delay into a first delay and a second delay; said first delay representing an integral number of analog-to-digital sampling clock periods preceding the current range gate delay; said second delay representing an integral number of fine delay increments where a sum of the first delay and the second delay is substantially equal to the current range gate delay;

(e) first programmable delay means for delaying the phase of the system clock signal by an amount of time equal to the second delay;

(f) second programmable delay means for delaying the pulse repetition interval trigger signal by an amount of time equal to the second delay; and (g) counting means, responsive to said first and second programmable delay means, for delaying preprocesing of an output of the analog-to-digital converter upon counting of a number of analog-to-digital sampling clock periods represented by the first delay.

16. The timing and control apparatus of claim 15, wherein the first and second programmable delay means are solid state programmable delay lines.

17. The timing and control apparatus of claim 15, wherein the first and second programmable delay means are phase locked loops.

18. The timing and control apparatus of claim 15, wherein the apparatus further includes rate reducing means for reducing the rate at which the range gate delay means generates the current range gate delay.

19. The timing and control apparatus of claim 15, wherein the dividing means is a programmable read-only memory device.

20. The timing and control apparatus of claim 15, wherein the apparatus further includes sampling means, responsive to the programmable delay means, for asserting a strobe signal causing the analog-to-digital converter to sample an echo for the duration of a digital sampling window.

21. A timing and control apparatus of a pulsed radiation system for detecting an echo signal; said system including a radiation detector, analog-to-digital converter, receiver, system clock signal, and a pulse repetition interval trigger input as well as initial range and velocity estimates; said timing and control apparatus comprising:

(a) range gate delay means for generating a range gate delay being a combination of an initial delay and one or more range rate delays; the initial delay corresponding to a range-to-target position at a first pulse repetition interval, and the range rate delay being the variation in the echo time between successive pulse repetition intervals;

(b) a programmable read-only memory device for generating from said range gate delay a coarse delay and a fine delay; said coarse delay representing an integer number of analog-to-digital sampling intervals of the range gate delay; said fine delay representing an integer number of programmable delay increments of a difference between the range gate delay and the coarse delay;

(c) a first programmable delay line for retarding the phase of the system clock signal by said fine delay;

(d) a second programmable delay line for retarding a pulse repetition interval trigger by said fine delay;

(e) a first counter, responsive to said first and second programmable delay lines, for counting a number of analog-to-digital sampling intervals given by said coarse delay; and (f) a second counter, responsive to the first programmable delay line and first counter, for causing the analog-to-digital converter to sample the echo signal upon elapse of the range gate delay;

whereby a sampling window may be made to autonomously track the received echo signal of a target with substantially constant velocity.

22. A timing and control apparatus of a preprocessor in a pulsed radiation system for detecting an echo signal; said system including a radiation detector, receiver, analog-to-digital converter, system clock signal, and a pulse repetition interval trigger signal; said timing and control apparatus comprising:

(a) feedback means for generating a current range gate delay comprising a range gate delay of a preceding pulse repetition interval and an incremental delay representing relative target velocity;

(b) dividing means for generating from said current range gate delay a coarse delay and a fine delay; said coarse delay representing an integer number of analog-to-digital sampling intervals of the current range gate delay; said fine delay representing an integer number of programmable delay increments of the current range gate delay less the coarse delay;

(c) first programmable delay means for delaying the phase of the system clock signal by an amount of time equal to the fine delay;

(d) second programmable delay means for delaying the pulse repetition interval trigger signal by an amount of time equal to the fine delay; and (e) counting means, responsive to said first and second programmable delay means, for delaying preprocesing of the analog-to-digital converter by an amount of time equal to the coarse delay;

whereby digitization of the echo signal is tracked over the course of multiple pulse repetition intervals.

23. A method for generating range gate delays in a pulsed radar system that tracks echoes of targets moving with a substantially constant velocity relative to the pulsed radar system; the method comprising the steps of:

(a) generating a range gate delay as a weighted linear combination of initial range and velocity delay estimates;

(b) dividing the range gate delay into a coarse delay and a fine delay, the coarse delay being an integer multiple of a period of a system clock and the fine delay being an integer multiple of a programmable delay line interval;

(c) delaying the phase of the system clock in accordance with the fine delay;

(d) counting out the coarse delay of the range gate delay using the delayed system clock of 23(c);

(e) acquiring one or more range gates with an analog-to-digital converter upon completion of the counting of 23(d);

whereby the acquisition of a range gate substantially coincides with the range gate delay elapse time.

24. A timing and control apparatus of a preprocessor in a pulsed radiation system for detecting echo signals; said system including a radiation detector, receiver, analog-to-digital converter, channel memory, and system clock signal; said timing and control apparatus comprising:

(a) range gate delay means for generating a range gate delay comprising an initial delay and one or more incremental delays; the initial delay corresponding to an initial range at a first pulse repetition interval, and the one or more incremental delays representing relative target velocity;

(b) dividing means for generating from said range gate delay a coarse delay and a fine delay; said coarse delay representing an integer number of analog-to-digital sampling clock periods of the range gate delay; said fine delay representing an integer number of programmable delay increments of the range gate delay less the coarse delay, where said fine delay is less than a single analog-to-digital sampling clock period;

(c) programmable delay means for retarding the phase of the system clock signal by said fine delay; and (d) range gating means, responsive to the programmable delay means, for causing analog-to-digital conversion and storage of the echo signal at a period of time, after the beginning of a pulse repetition interval, comprised of an integer number of analog-to-digital sampling clock periods given by the coarse delay;

whereby analog-to-digital conversion of the echo signal is made to track a target over a course of multiple pulse repetition intervals.

25. A timing and control apparatus of a preprocessor in a pulsed radiation system for detecting echo signals; said system including a radiation detector, receiver, analog-to-digital converter, and system clock signal; said timing and control apparatus comprising:

(a) range gate delay means for generating a range gate delay comprising an initial delay and one or more incremental delays; the initial delay corresponding to an initial range at a first pulse repetition interval, and the one or more incremental delays representing relative target velocity;

(b) dividing means for generating from said range gate delay a coarse delay and a fine delay; said coarse delay representing an integer number of analog-to-digital sampling intervals of the range gate delay; said fine delay representing an integer number of programmable delay increments of the range gate delay less the coarse delay;

(c) programmable delay means for retarding the phase of the system clock signal by said fine delay;

(d) counting means for asserting a terminal count signal a period of time, after the beginning of a pulse repetition interval, given by the coarse delay; and (e) range gating means, responsive to the programmable delay means and the terminal count signal, for causing analog-to-digital conversion of the echo signal to coincide with the range gate delay;

whereby analog-to-digital conversion of the echo signal is made to track a target over a course of multiple pulse repetition intervals.

* * * * *

UNITED STATES PATENT AND TRADEMARK OFFICE
CERTIFICATE OF CORRECTION

PATENT NO. : 6,281,833 B1 Page 1 of 1
DATED : August 28, 2001
INVENTOR(S) : Richard C. Pringle and Charles T. McMurray It is certified that error appears in the above-identified patent and that said Letters Patent is hereby corrected as shown below:

Column 1,
Line 4, "The U.S. Government has a paid-up license in this invention and the right in limited circumstances to require the patent owner to license others on reasonable terms as provided for by the terms of contract No. N00019-94-C-0078 awarded by U.S. Department of Defense (Navy)." should read
-- FEDERALLY SPONSORED RESEARCH
The invention was made with Government support under N00019-94-C-0078 awarded by the Department of the Navy. The Government has certain rights in the invention. --

Signed and Sealed this

Fourth Day of June, 2002

Attest:

Attesting Officer

JAMES E. ROGAN
*Director of the United States Patent and Trademark Office*